United States Patent [19]

Anderson et al.

[11] Patent Number: 4,569,542
[45] Date of Patent: Feb. 11, 1986

[54] PIPE COUPLING

[75] Inventors: Gerald L. Anderson, Bradford; Phillip E. Frair, Shinglehouse, both of Pa.

[73] Assignee: Dresser Industries, Inc., Dallas, Tex.

[21] Appl. No.: 536,082

[22] Filed: Sep. 26, 1983

[51] Int. Cl.$^4$ ............................................. F16L 17/00
[52] U.S. Cl. .................... 285/337; 285/342; 285/348; 285/372
[58] Field of Search ............... 285/372, 337, 342, 343, 285/348

[56] References Cited

U.S. PATENT DOCUMENTS

| | | | |
|---|---|---|---|
| 931,171 | 8/1909 | Williams | 285/372 X |
| 2,461,828 | 2/1949 | Lomelino | 285/343 OR |
| 2,474,880 | 7/1949 | Woodling | 285/337 X |
| 2,779,610 | 1/1957 | Risley | 285/323 |
| 2,787,479 | 4/1957 | Burns | 285/342 X |
| 4,119,335 | 10/1978 | Rieffle et al. | 285/337 |

FOREIGN PATENT DOCUMENTS

| | | | |
|---|---|---|---|
| 2726035 | 12/1977 | Fed. Rep. of Germany | 285/372 |
| 551006 | 2/1943 | United Kingdom | 285/343 |

Primary Examiner—Cornelius J. Husar
Assistant Examiner—Douglas W. Hanson

[57] ABSTRACT

A pipe coupling for the joining of plain end pipe that includes an annular gasket and a compressible lock ring at each end of the coupling between a tubular middle ring and an annular follower. Bolts extending between the opposite followers are effective when tightened to compress both the gasket and lock ring into their operative relation for sealing and gripping a coupled pipe end, respectively. An annular recess contained in the backface of the gasket affords a clearance of controlled dimension initially about the juxtaposed portion of the lock ring. The clearance functions when the bolts are tightened to enable gasket sealing pressure to be achieved about the pipe sequentially before an effective grip on the pipe is attained by the lock ring.

5 Claims, 5 Drawing Figures

PIPE COUPLING

TECHNICAL FIELD

The field of art to which the invention pertains includes the art of pipe joints and pipe couplings.

BACKGROUND OF THE INVENTION

Pipe couplings are commercially available from a variety of manufacturing sources and are used extensively for underground pipe installations as in the distribution of natural gas. It is known in such couplings to employ gripping members of sorts in order to prevent in-service uncoupling of the joint by longitudinal drawbar forces imposed on the coupled pipe section.

With the advent of plastic pipe and tubing and their approval by regulating governmental agencies for natural gas transmission, the previous problem of pipe pullout from a coupled joint has increased many times over to on the order of tenfold as compared to metal pipe. One factor most contributing to this problem is the much greater linear coefficient of thermal expansion for plastic pipe as compared to steel pipe. By way of example, Aldyl "A" polyethylene piping marketed by Dupont has a linear coefficient of thermal expansion stated by the manufacturer to be: $9 \times 10^{-5}$ in/in. F° as compared to $6.5 \times 10^{-6}$ in/in. F° for steel pipe. Notwithstanding, government agencies regulating installation of such systems require that each joint sustain the longitudinal pullout or thrust forces caused by contraction or expansion of the piping or by anticipated external or internal loading to within prescribed limits. (Title 49, Section 192, "Transportation of Natural and Other Gas by Pipeline-Minimum Safety Regulations"—Fed. Vol. 35, No. 161).

While the degree of pipe restraint or lockup imposed on the coupled joint is critical, it is at least equally critical that adequate gasket compression be achieved about the coupled pipe in the course of coupling installation to insure a seal against leakage of line content. A typical bolt type coupling construction utilized in the prior art for natural gas service comprises the combination of a gasket to effect sealing and a lock ring to restrain the pipe against pullout. Such couplings are operationally characterized by a grip imposed on the pipe by the lock ring that normally occurs before or substantially simultaneous with attainment of the required gasket pressure for sealing.

To the extent pipe grip by the lock ring occurs before gasket pressure is achieved, some slight displacement of the pipe ends may occur relative to each other in the course of completing the gasket seal. There are, however, certain installations where, for example, the pipe ends are butting or restrained such as at a final tie-in that preclude pipe displacement to enable completion of the gasket seal. In those situations, should the prior coupling construction effect lockup before the required gasket seal is obtained about the coupled pipe, the required gasket seal may not be obtained.

SUMMARY OF THE INVENTION

The invention relates to an improved pipe coupling of the bolted lock type for use on pipelines carrying high pressure combustible gas as to enable both a lock grip and gasket pressure to be achieved in accordance with prescribed standards of installation. More specifically, the invention relates to such a pipe coupling having greater versatility of installation than comparable similar purpose couplings of the prior art in not being inhibited or precluded from use where constraint on movement of the pipe ends is otherwise being imposed.

The foregoing is achieved in accordance with the invention by a coupling construction that includes an annular gasket and a compressible lock ring at each end of the coupling between the middle ring and an annular follower. The backface of the gasket is constructed having a centrally located annular recess which when the gasket is uncompressed is of predetermined size to afford a controlled clearance both radially and axially about the juxtaposed portion of the lock ring thereat. When the installation bolts extending between the followers are subsequently tightened, gasket compression is obtained first such that lockup by the lock ring sequentially occurs only after adequate gasket pressure has been completely obtained.

It is therefore an object of the invention to effect an improved pipe coupling of the bolted lock type able to effect both adequate gasket pressure and pipe lockup even where movement of the pipe ends is otherwise restrained.

Figure 1:
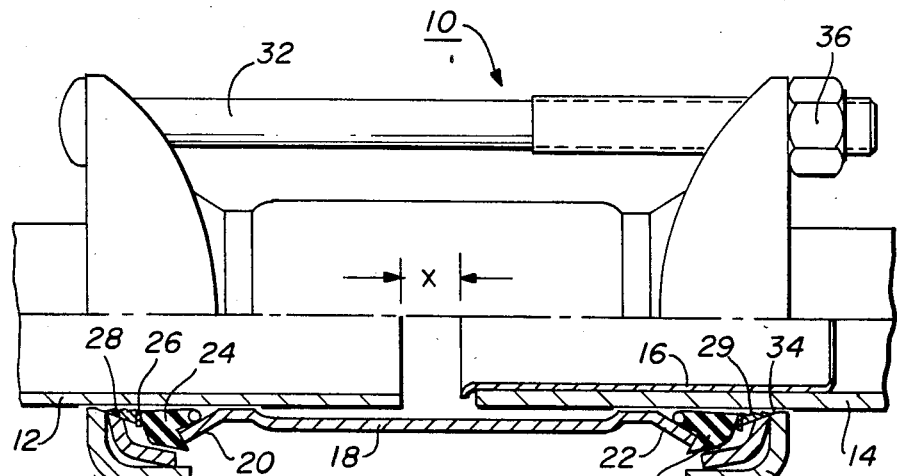
FIG. 1 is a plan view partially sectioned of a bolted lock type pipe coupling in accordance with the prior art with the components in their pre-installation relations.
Figure 2:
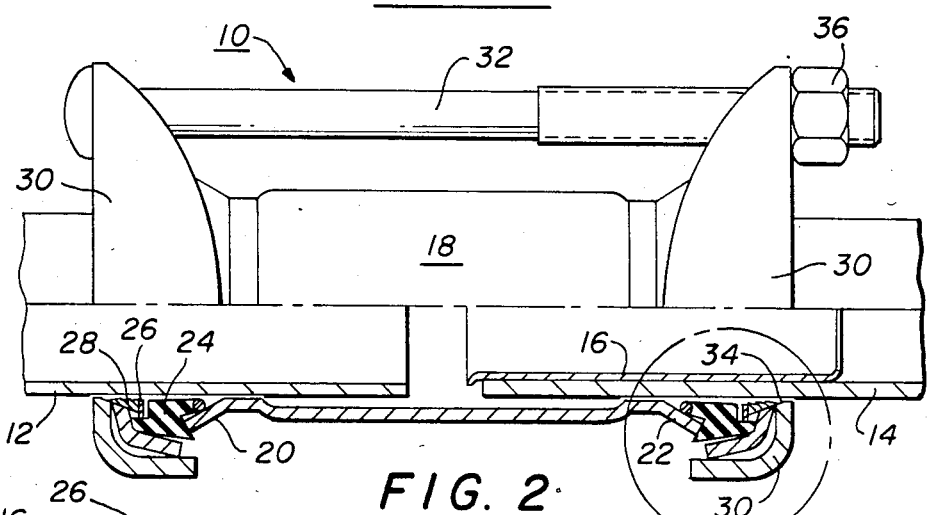
FIG. 2 is a view similar to FIG. 1 for the pipe coupling in accordance with the invention.
Figure 4:
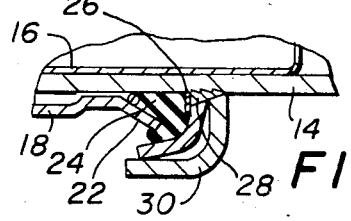
FIG. 4 is a fragmentary view of the encircled portion of FIG. 2 illustrating the post-installation relation of the components thereat.

Referring first to FIG. 1, there is shown a coupling 10 in accordance with the prior art adapted to couple pipe ends 12 and 14, one or both of which may be either of steel or plastic composition. As shown, pipe end 14 is of plastic composition and for which there is provided the customary steel insert 16 to insure against pipe collapse in the course of installing the coupling.

Figure 5:
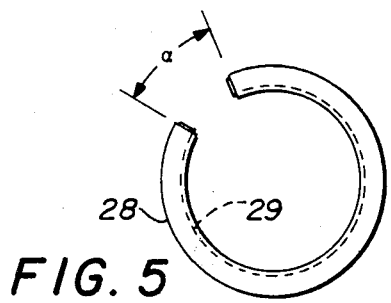
FIG. 5 is a side elevation of the lock ring.
Figure 3:
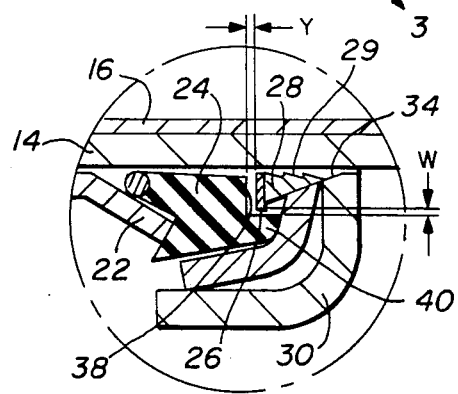
FIG. 3 is a fragmentary enlargement of the encircled portion of FIG. 2.

Comprising coupling 10 is a tubular middle ring 18 outwardly flared at each of its ends 20 and 22 for receiving an annular elastomeric gasket 24. Contiguously behind each gasket is an annular backup ring 26 engaged by an arcuate lock ring 28 toothed about its inner surface 29 and split about its circumference as shown in FIG. 5. Containing gasket 24 and lock ring 28 in position at each end of the middle ring is a pair of double wall followers 30 joined together by a plurality of longitudinal bolts 32 and companion nuts 36. Each follower includes a bevel shaped central opening 34 encircling the received pipe end and engaging the outer tapered surface of lock ring 28 thereat.

To form and install the coupled joint, nuts 36 are tightened on bolts 32 which draws the opposite followers 30 toward each other. In the course of installation each lock ring 26 is compressed inwardly about the pipe end, while each gasket 24 is compressed for effecting a pressure tight seal. Typically for gas distribution piping, nuts 36 are torqued to a recommended standard of about 80 ft/lbs. As previously noted supra, the grip of lock rings 28 against the pipe ends 12 and 14 normally occurs before or substantially simultaneous with achieving the required degree of sealing force imposed by gaskets 24. To the extent, however, that the intended degree of ring grip occurs prior to the required gasket force being achieved, the pipes will incur a degree of axial displacement toward each other in the course of completing the gasket seal as permitted by the original pipe separation spacing X. Should, however, spacing X be non-existent or insufficient as where the pipe ends are originally in butting relationship, etc., it can be appreciated that displacement of the pipes to enable achieving gasket pressure would be precluded. Further torque applied to the bolts under those circumstances will only be transmitted to the end faces of the pipe rather than to the gasket as intended. Consequently, the foregoing can result in an undetectable but inadequate gasket seal which even if sufficient to pass an initial pressure test can likely incur leakage subsequently as the gasket relaxes with age.

Referring now to FIGS. 2-5, the coupling improvement of the invention will now be described, and from which it will be understood that the coupling is similar to the prior art coupling above except with respect to those features specifically discussed below. For these purposes, therefore, each gasket 24 includes an annular axially extending central recess 38 formed in its backface as to result in an annular outer rib 40 extending axially rearward toward engagement against the inside face of follower 30 thereat. When initially assembled on the pipe ends as seen as FIGS. 2 and 4, an axial clearance of dimension Y exists between the radial face of recess 38 and the parallel face of the backup ring 26, while an annular radial clearance of dimension W exists between the O.D. of the backup ring and the I.D. of the recess defined by rib 40.

With this relationship maintained, initial contact between the gasket and the inside face of the followers occurs only with rearwardly extending rib 40. As the followers are drawn toward each other by tightening of nuts 36, rib 40 and the remainder of the gasket continue to be compressed until the recommended 80 ft/lb. tightening torque is reached. Concomitantly therewith, movement of the followers first displace backup ring 26 and the lock ring 28 further into the gasket recess 38. At such time as deformation of the gasket begins to distend rearwardly toward the follower, lock ring 26 is pushed away by the deforming gasket down the incline surface of tapered follower opening 34. This causes ring 28 to collapse circumferentially until a grip lock penetration is achieved with the encircled pipe wall. Because ring 28 is initially of a split construction with a void corresponding to angle α, backup ring 26 maintains gasket confinement and avoids undesirable gasket penetration into the uncollapsed split of the backup ring. As a consequence of this construction, the required gasket pressure is always achieved sequentially before lockup of the contained pipe such that displacement of the pipe ends is unnecessary to assure installation in the manner of the prior art.

It can be appreciated that both the radial clearance W and axial clearance Y are factors in determining the point at which loading of lock ring 28 is initiated. Preferably, the radial clearance is slightly greater than the minimum established for allowing complete gasket collapse against the pipe since any lesser clearance results in backup ring 26 restraining the gasket from collapsing to the pipe and sealing. At the same time, the allowed axial clearance is determined by the point at which it is desired to reach adequate gasket rib compression and begin lock ring travel. This point is generally selected to occur at a bolt tightening force of about 50 to 60 ft/lbs., since at this torque the gasket is almost totally compressed. Further tightening to the recommended 80 ft/lb. torque then moves the lock ring into final position while still adding force to gasket compression. The taper of opening 34 is coordinated consistent with the foregoing to develop the required radial travel necessary to effect a ring collapsed gripping engagement.

By the above description there is disclosed a novel coupling construction affording distinct advantages and enhanced versatility of conditions where such coupling can be utilized as compared to similar purpose couplings of the prior art. By a relatively simple and effective change in the gaskets construction per se, a solution to a long-standing problem has been resolved in a highly economical manner.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pipe coupling including a middle ring adapted to receive at least one pipe end to be coupled, an annular elastomeric gasket located to be intervening between an end of said middle ring and the received pipe end, a circumferentially collapsible lock ring axially outward of said gasket and effective when collapsed to grip the surface of the received pipe end for imposing an axial restraint thereon, a follower axially outward of said lock ring, and bolt and nut means engaging said follower and effective when tightened to draw said follower toward said middle ring for deforming said gasket into a pressure seal between the middle ring and pipe wall and thereafter effecting collapse of said lock ring, the improvement comprising control means effective in the course of said bolt and nut means being tightened to achieve a predetermined level of gasket deformation prior to effecting completed collapse of said lock ring, said control means including an axial extending central recess in the surface of said gasket facing said lock ring and having an annular rib extending axially rearward and positioned to make contact with said follower before collapse of said lock ring is initiated, said recess defining an initial predetermined clearance between said gasket and said lock ring.

2. An improved pipe coupling for connecting adjacent ends of pipes and the like, the improved pipe coupling comprising in combination:
   a tubular middle ring sized to receive the pipe ends and having outwardly flared ends;
   an annular elastomeric gasket encircling each of the pipe ends including a first end in engagement with said flared ends and a second end having an axially projecting annular rib spaced from the pipe ends forming an annular recess adjacent to the pipe ends;
   collapsible gripping means loosely encircling each of the pipe ends partially located in said recesses in spaced relation to and moveable relative to said gaskets for engaging and axially restraining the pipe ends;
   annular follower means encircling the pipe ends in engagement with said gripping means and gasket ribs for deforming said gaskets into sealing engagement with said middle ring and pipe ends and for subsequently moving said gripping means into holding engagement with the pipe ends; and, means engaging said follower means for moving said follower means to deform said gasket and to move said gripping means.

3. The pipe coupling of claim 2 wherein said annular ribs are spaced axially and radially from said gripping means.

4. The pipe coupling of claim 2 wherein:

said gripping means has an outer surface disposed at an angle with respect to the axis of the pipe ends; and, said follower means including an annular interior surface disposed parallel to the outer surface of said gripping means, a portion of said outer surface and said inner surface being disposed in juxtaposition prior to movement of said follower means toward said middle ring.

5. The pipe coupling of claim 3 wherein:

said gripping means has an outer surface disposed at an angle with respect to the axis of the pipe ends; and, said follower means including an annular interior surface disposed parallel to the outer surface of said gripping means, a portion of said outer surface and said inner surface being disposed in juxtaposition prior to movement of said follower means toward said middle ring.

* * * * *